United States Patent
Hashimoto et al.

(10) Patent No.: US 11,834,062 B2
(45) Date of Patent: Dec. 5, 2023

(54) NOTIFICATION LOCATION SETTING DEVICE, STORAGE MEDIUM STORING COMPUTER PROGRAM FOR NOTIFICATION LOCATION SETTING, AND NOTIFICATION LOCATION SETTING METHOD

(71) Applicant: TOYOTA JIDOSHA KABUSHIKI KAISHA, Toyota (JP)

(72) Inventors: Ryuta Hashimoto, Tokyo-to (JP); Yuma Ito, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 17/363,730

(22) Filed: Jun. 30, 2021

(65) Prior Publication Data

US 2022/0001888 A1 Jan. 6, 2022

(30) Foreign Application Priority Data

Jul. 1, 2020 (JP) .................................. 2020-113969

(51) Int. Cl.
*B60W 50/14* (2020.01)
*B60W 60/00* (2020.01)
*B60W 30/18* (2012.01)
*B60W 40/06* (2012.01)

(52) U.S. Cl.
CPC ...... *B60W 50/14* (2013.01); *B60W 30/18163* (2013.01); *B60W 40/06* (2013.01); *B60W 60/0053* (2020.02); *B60W 60/0057* (2020.02); *B60W 2050/146* (2013.01)

(58) Field of Classification Search
CPC ....... B60W 2050/146; B60W 2556/50; B60W 30/18163; B60W 40/06; B60W 50/14; B60W 60/0053; B60W 60/0057
See application file for complete search history.

(56) References Cited

U.S. PATENT DOCUMENTS

| | | |
|---|---|---|
| 2020/0231158 A1 | 7/2020 | Okuyama et al. |
| 2020/0283027 A1 | 9/2020 | Okuyama |
| 2021/0323574 A1* | 10/2021 | Yoo ........................ G08G 1/166 |
| 2022/0001867 A1* | 1/2022 | Hashimoto ..... B60W 30/18163 |
| 2022/0316913 A1* | 10/2022 | Kashu .................. G01C 21/367 |

FOREIGN PATENT DOCUMENTS

| | | |
|---|---|---|
| JP | 2017-019397 A | 1/2017 |
| JP | 2019-109666 A | 7/2019 |
| WO | 2019/064349 A1 | 4/2019 |
| WO | 2019/064350 A | 4/2019 |

* cited by examiner

*Primary Examiner* — Quan Zhen Wang
*Assistant Examiner* — Rajsheed O Black-Childress
(74) *Attorney, Agent, or Firm* — Sughrue Mion, PLLC

(57) ABSTRACT

A notification location setting device comprises a notification device, and a processor configured to set on a traveling road a notification location where the driver is to be notified of a control switching request for switching operation of the vehicle from automatic control to manual control, based on the shape of a width-varying zone where the width of the traveling road varies before a merging location, in a case where a merging location where the traveling road on which the vehicle is traveling within a traveling route toward the destination location of the vehicle merges with another road, and to notify the driver of the control switching request via the notification device when the vehicle has not entered the other road at the notification location.

15 Claims, 9 Drawing Sheets

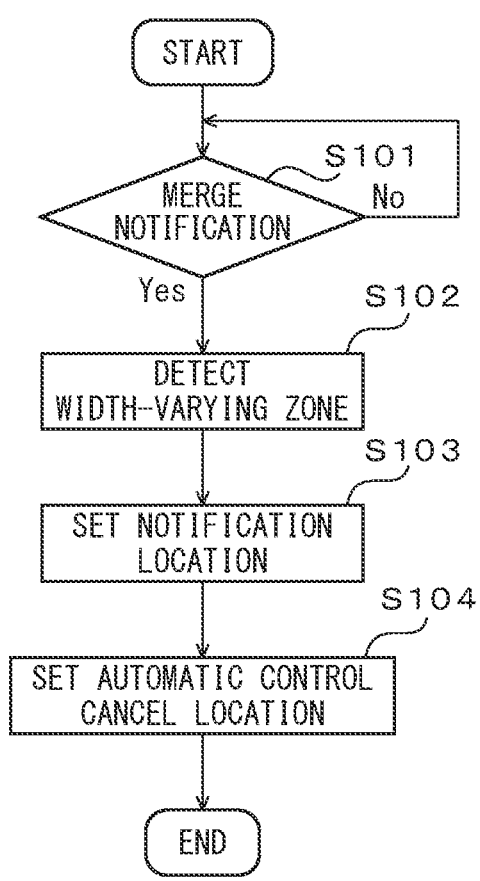

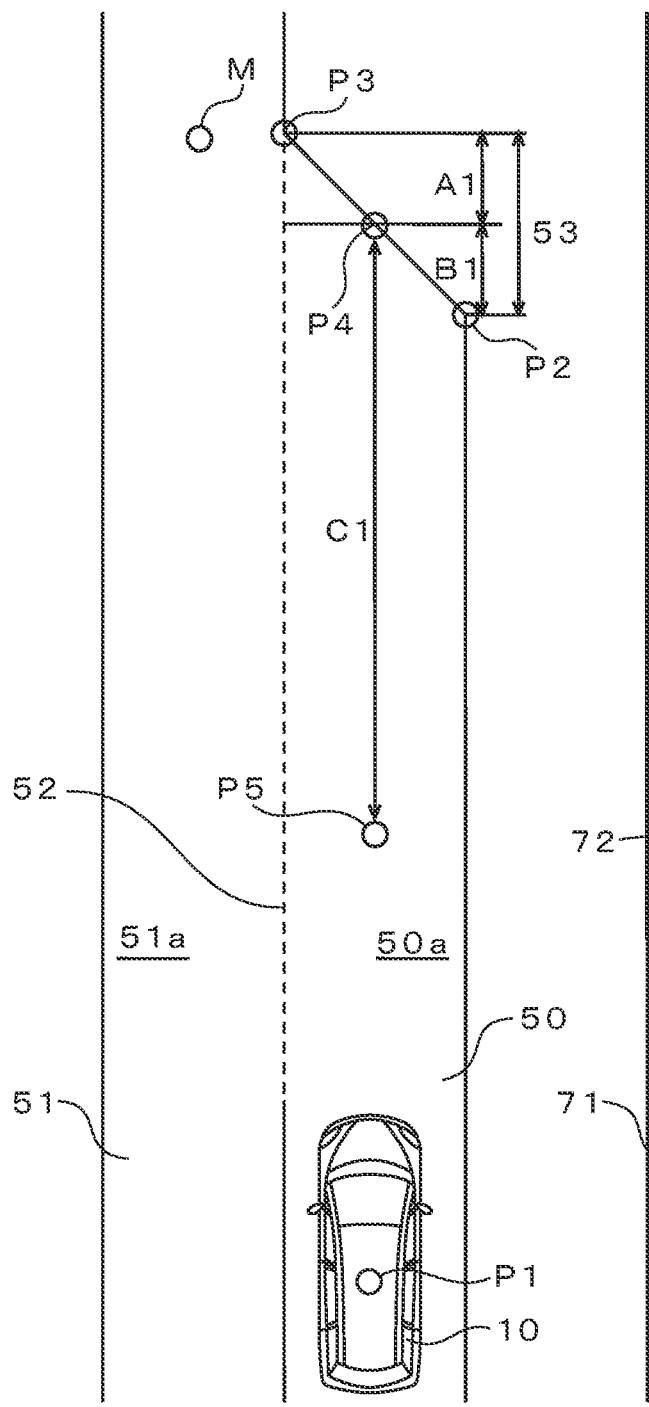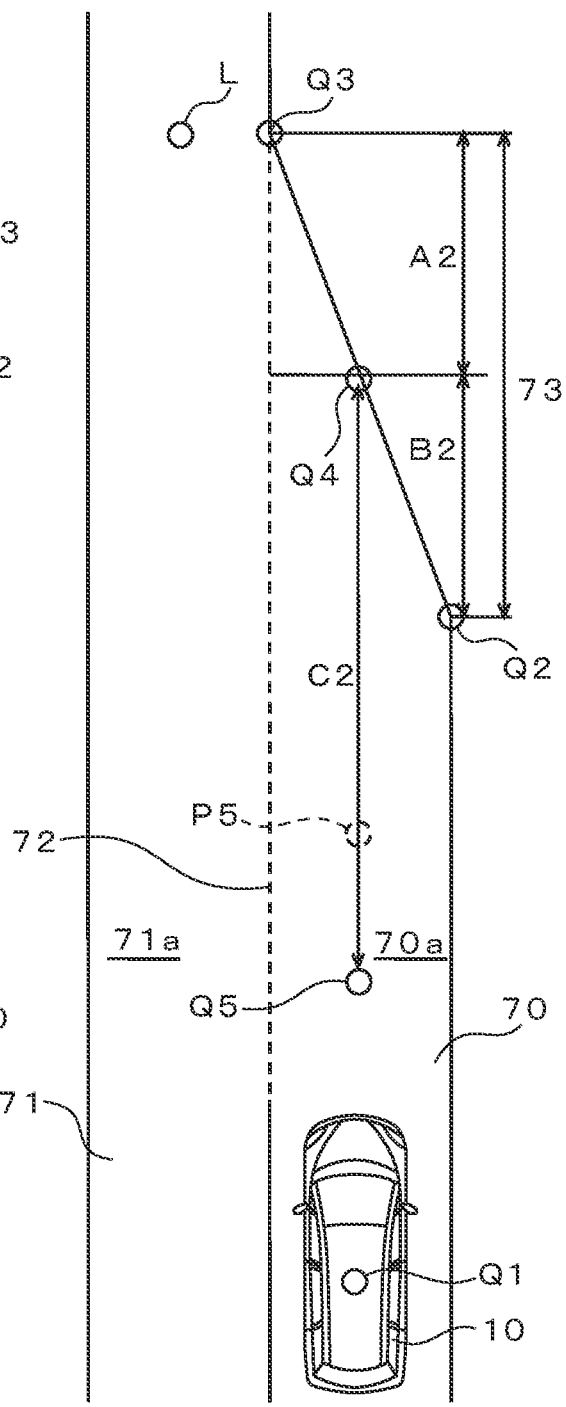

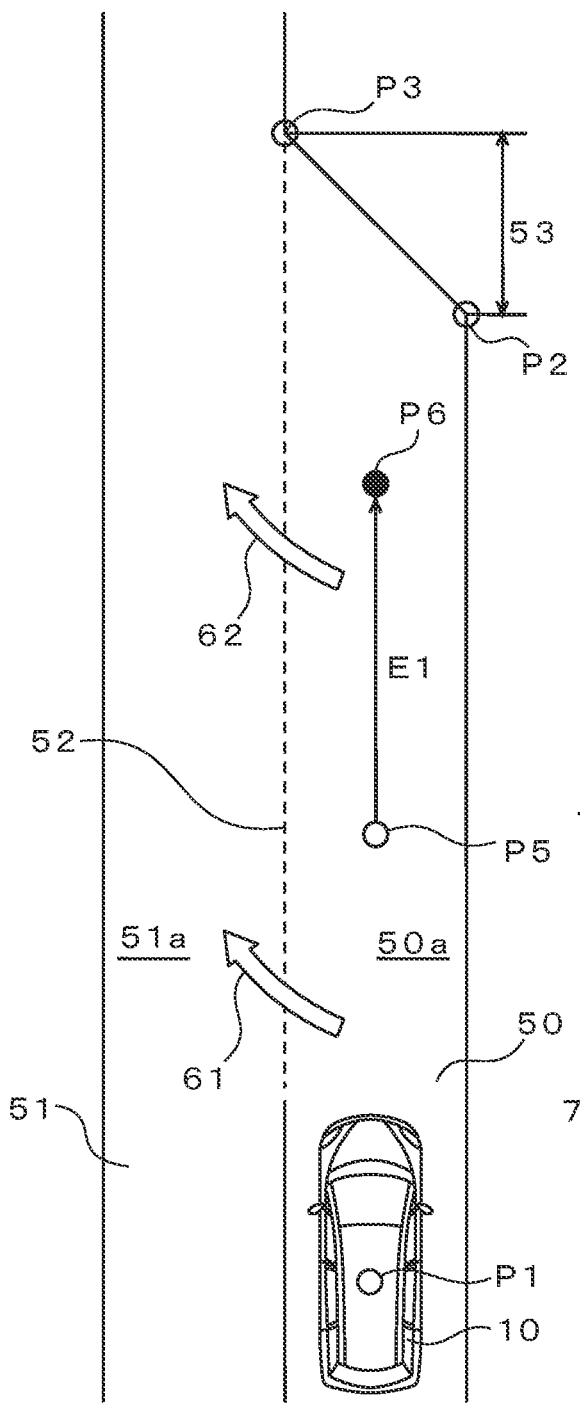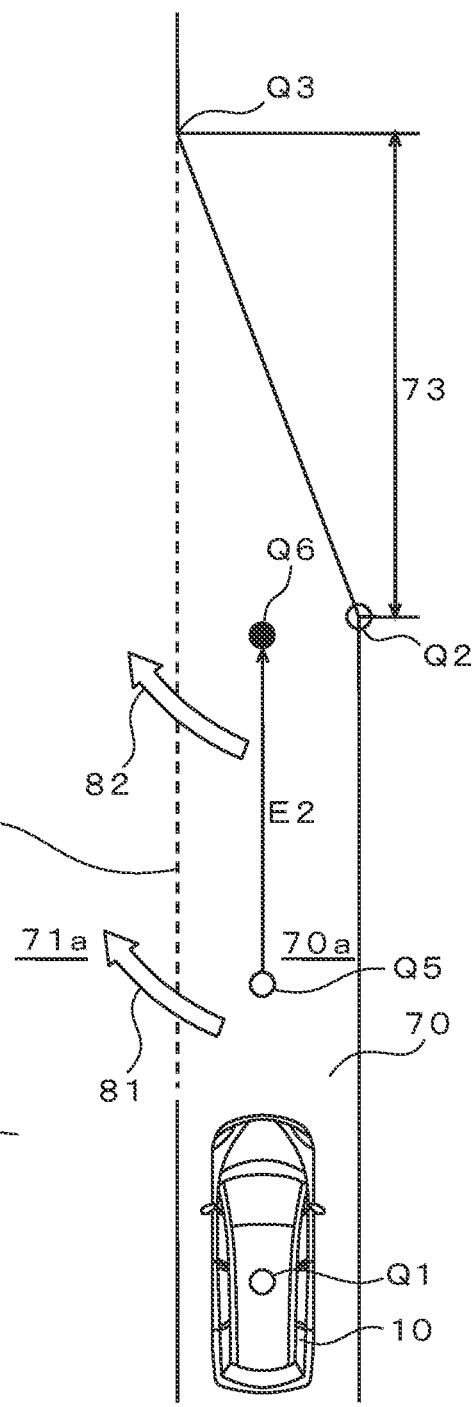

NOTIFICATION LOCATION SETTING DEVICE, STORAGE MEDIUM STORING COMPUTER PROGRAM FOR NOTIFICATION LOCATION SETTING, AND NOTIFICATION LOCATION SETTING METHOD

FIELD

The present invention relates to a notification location setting device, to a storage medium storing a computer program for notification location setting, and to a notification location setting method.

BACKGROUND

An automatic control device mounted in a vehicle creates a traveling route for the vehicle based on the current location of the vehicle, the destination location of the vehicle, and map information, and controls the vehicle so that it travels along the traveling route.

When the traveling route includes a merging location where the traveling road on which the vehicle is traveling merges onto another road, the automatic control device controls the vehicle so that it enters from the traveling road to the other road toward the merging location. The automatic control device also controls running motion of the vehicle, when it is entering another road from the traveling road, so that a safe distance is maintained between the vehicle and the other vehicle.

According to one proposal, when it has been assessed that the vehicle cannot enter the other road from the traveling road toward the merging location by automatic control, control of the vehicle is switched from automatic control to manual control, so that the driver operates the vehicle manually for entry from the traveling road to the other road (Japanese Unexamined Patent Publication No. 2019-10966, for example).

SUMMARY

When the width of a traveling road on which the vehicle is traveling decreases toward the merging location, the degree of decrease (the tapered form) differs depending on the road. Specific cases are: (1) where the degree of decrease in the traveling road width is sudden, and (2) where the degree of decrease in the traveling road width is gradual. In case (1), the length of the zone where the width of the traveling road varies in a decreasing manner is relatively short, while in case (2), the length of the zone where the width of the traveling road varies in a decreasing manner to the merging location is relatively long.

Between the merging location and the notification location where the driver is notified to switch operation of the vehicle from automatic control to manual control, it is necessary to ensure a predetermined length of traveling road having a width in which the vehicle can travel. This is so that the driver that has been notified of a control switching request can be given sufficient time to control the vehicle by manual control for merging. In other words, it is preferred for the driver to be notified of the control switching request at a sufficient point before the width of the traveling road begins to decrease.

It is therefore an object of the present invention to provide a notification location setting device that sets the notification location at which the driver is to be notified of a control switching request, based on the shape of the traveling road before a merging location.

One embodiment of the invention provides a notification location setting device. The notification location setting device has a notification unit, a notification location setting unit that sets on a traveling road a notification location where the driver is to be notified of a control switching request for switching operation of the vehicle from automatic control to manual control, based on the shape of a width-varying zone where the width of the traveling road varies before a merging location, in a case where a merging location where the traveling road on which the vehicle is traveling within a traveling route toward the destination location of the vehicle merges with another road and a notification controller that notifies the driver of the control switching request via the notification unit when the vehicle has not entered the other road at the notification location.

In this notification location setting device, it is preferred that the notification location setting unit sets the notification location on the traveling road to be further away from the merging location with a smaller degree of decrease in the width of the width-varying zone toward the merging location.

In this notification location setting device, it is preferred that wherein the notification location setting unit determines a split location on the traveling road, where the width-varying zone is split at a predetermined ratio, and sets the notification location based on the split location.

In this notification location setting device, it is preferred that the notification location setting unit sets the split location in the traveling road so as to be further away from the merging location when a structure of at least a predetermined height is present alongside the width-varying zone, than when no structure of at least the predetermined height is present alongside the width-varying zone.

In this notification location setting device, it is preferred that the notification location setting device has a width-varying zone detector that detects the location where the width of the traveling road begins to vary before the merging location, as the start location of the width-varying zone, and detects the location on the traveling road that lines up with the intersection between an extension line which is the extension into the other road from the center line of the zone in which the width of the traveling road is varying before the merging location, and the center line of the other road, as the end location of the width-varying zone.

In this notification location setting device, it is preferred that the notification location setting device has a width-varying zone detector that detects the location where the width of the traveling road begins to vary before the merging location, as the start location of the width-varying zone, and detects the location where the zone in which the width of the traveling road is varying before the merging location has its width decreased to zero toward the traveling direction of the vehicle, as the end location of the width-varying zone.

In this notification location setting device, it is preferred that the notification location setting device has a cancel location setting unit that sets an automatic control cancel location at which operation of the vehicle is forcibly changed from automatic control to manual control, based on the notification location.

According to another embodiment, a computer-readable non-transitory storage medium is provided which stores a computer program for notification location setting. The computer program for notification location setting causes a processor to set on a traveling road a notification location where the driver is to be notified of a control switching request for switching operation of the vehicle from automatic control to manual control, based on the shape of a width-varying zone where the width of the traveling road varies before a merging location, in a case where a merging location where the traveling road on which the vehicle is traveling within a traveling route toward the destination location of the vehicle merges with another road; and to notify the driver of the control switching request via a notification device when the vehicle has not entered the other road at the notification location.

According to another embodiment there is provided a notification location setting method. In the notification location setting method, a notification location setting device executes to set on a traveling road a notification location where the driver is to be notified of a control switching request for switching operation of the vehicle from automatic control to manual control, based on the shape of a width-varying zone where the width of the traveling road varies before a merging location, in a case where a merging location where the traveling road on which the vehicle is traveling within a traveling route toward the destination location of the vehicle merges with another road and to notify the driver of the control switching request via a notification device when the vehicle has not entered the other road at the notification location.

In the notification location setting device of the invention, the notification location where notification is made of a control switching request for change of operation of the vehicle from automatic control to manual control is set based on the shape of the traveling road ahead of the merging location, and therefore the driver is able to receive the control switching request with a sufficient amount of time to spare.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is an operation flow chart for a notification location setting device (1).

FIG. 5A is a diagram illustrating processing by a notification location setting unit.

FIG. 5B is a diagram illustrating processing by a notification location setting unit.

FIG. 6A is a diagram illustrating processing by a cancel location setting unit.

FIG. 6B is a diagram illustrating processing by a cancel location setting unit.

DESCRIPTION OF EMBODIMENTS

Figure 1A:
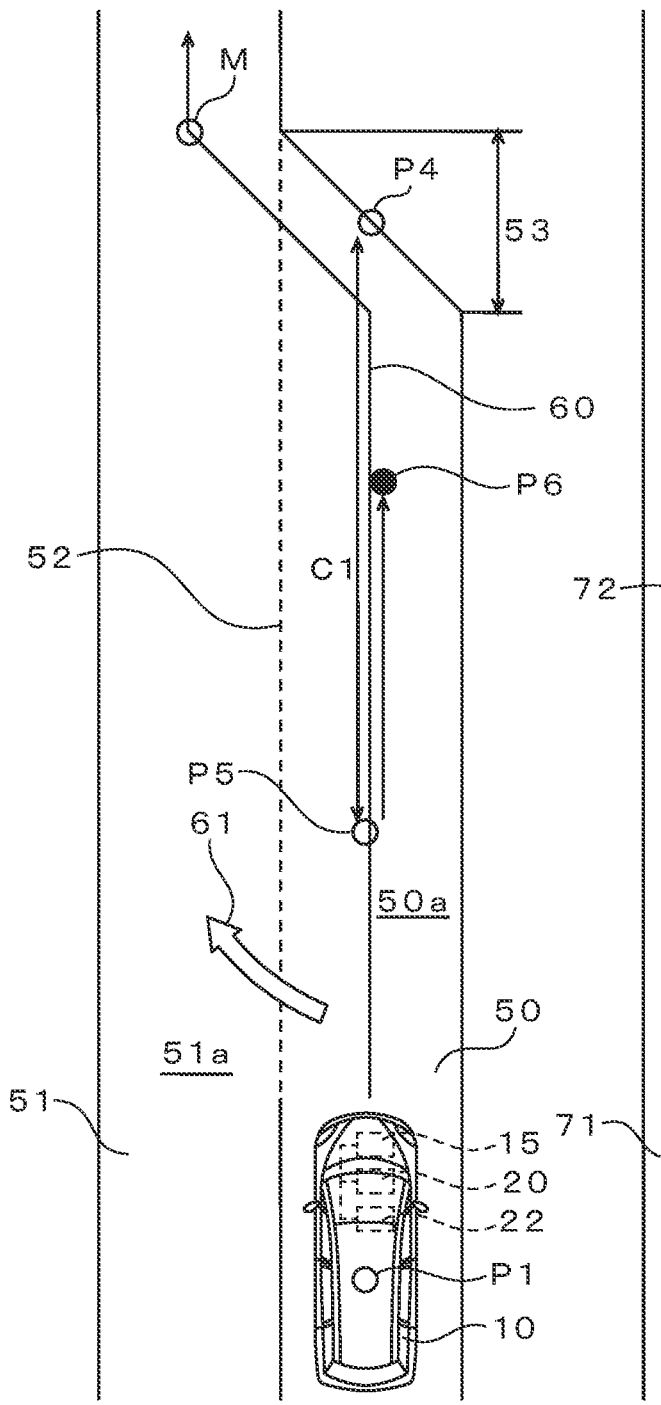
FIG. 1A is a diagram illustrating operation of a notification location setting device in overview.
Figure 1B:
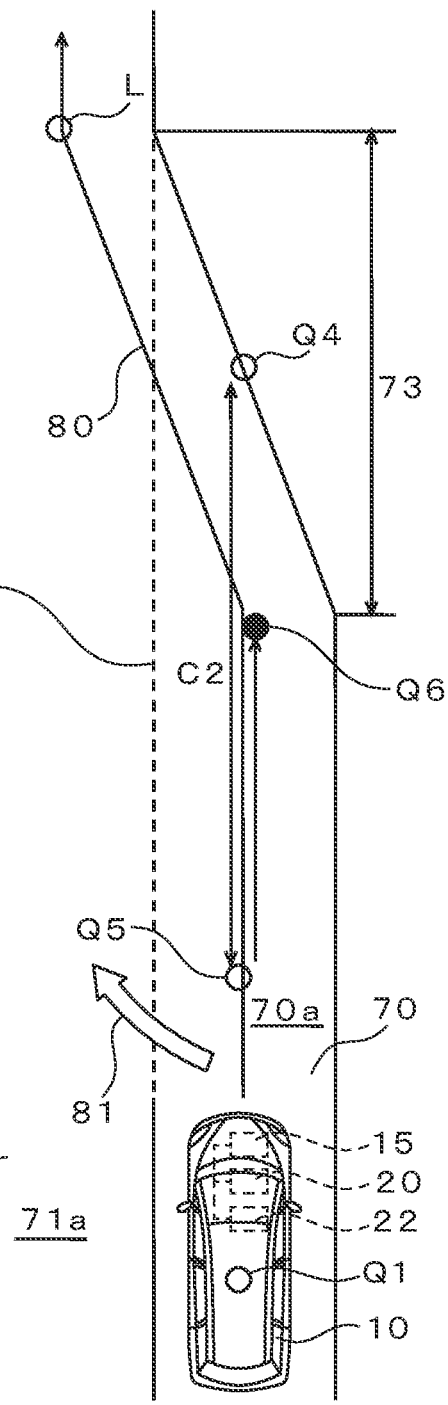
FIG. 1B is a diagram illustrating operation of a notification location setting device in overview.

FIG. 1A and FIG. 1B are diagrams illustrating operation of a notification location setting device in overview. Operation of the notification location setting device disclosed herein will now be described in overview with reference to FIG. 1A and FIG. 1B.

The example illustrated in FIG. 1A shows a vehicle 10 whose operation is automatically controlled, in a state of traveling on a road that includes an acceleration lane 50a (acceleration lane road) 50, for entry to a road that includes a main lane 51a on a high-speed road (main lane road) 51. In the example shown in FIG. 1A, the shape of the width-varying zone 53 has a suddenly decreasing width toward the merging location M, and the length of the width-varying zone 53 is relatively short.

The vehicle 10 has a traveling route 60 produced by a navigation device 15, whereby it enters the main lane road 51 from the acceleration lane road 50, across a dividing line 52 which divides the acceleration lane road 50 and the main lane road 51. The traveling route 60 includes a merging location M where the acceleration lane road 50 on which the vehicle 10 is traveling merges with the main lane road 51. The vehicle 10 also has a scheduled traveling trajectory 61 for lane change created by a drive planning device 20, whereby it changes traffic lanes by automatic control and enters the main lane road 51 from the acceleration lane road 50.

Although the vehicle 10 is automatically controlled to enter the main lane road 51 from the acceleration lane road 50 according to the scheduled traveling trajectory 61, it may not always be possible to make the lane change as prescribed by the lane change scheduled traveling trajectory 61, depending on the traveling conditions of other vehicles traveling on the main lane road 51. Therefore, the notification location setting device 22 of the vehicle 10 sets a notification location P5 where the driver is notified of the control switching request for switching from automatic control to manual control, and an automatic control cancel location P6 where the switch from automatic control to manual control is forcibly made.

As mentioned above, the notification location P5 where notification is made of the control switching request for switching from automatic control to manual control must be a location that allows the driver to receive the control switching request with both sufficient psychological and physical allowance. The notification location setting device 22 therefore sets the notification location P5 based on the shape of the width-varying zone 53 in which the acceleration lane road 50 suddenly decreases in width before the merging location M, and sets the automatic control cancel location P6 based on the set notification location P5.

In the example shown in FIG. 1B, the shape of the width-varying zone 73 has a gradually decreasing width toward the merging location L, and the length of the width-varying zone 73 is relatively long. As shown in FIG. 1A, the vehicle 10 has a traveling route 80 created by the navigation device 15, and a scheduled traveling trajectory 81 for lane change, created by the drive planning device 20. The notification location setting device 22 also sets a notification location Q5 where the driver is notified of the control switching request for switching from automatic control to manual control, and an automatic control cancel location Q6 where the switch from automatic control to manual control is forcibly made.

Comparing the situations depicted in FIG. 1A and FIG. 1B, the notification location setting device 22 sets notification locations P5, Q5 according to the shape of each width-varying zone, so as to lengthen the lengths of the zones C1, C2 of the acceleration lane road 70 which has a width guaranteed to allow travel of the vehicle 10 between the notification location and the merging location. Specifically, since the location where the width of the width-varying zone begins to narrow is at an earlier point in FIG. 1B, the notification location Q5 is set to be before the notification location P5. When the width of the width-varying zone begins to narrow, this creates more psychological pressure on the driver, and therefore notification is made earlier when the lane change by automatic control cannot be made at the predetermined location. Thus, in the notification location setting device 22 of the invention, the notification location where notification is made of a control switching request for switching from automatic control to manual control is set based on the shape of the traveling road ahead of the merging location, and therefore the driver is able to receive the control switching request with a sufficient amount of time to spare.

Figure 2:
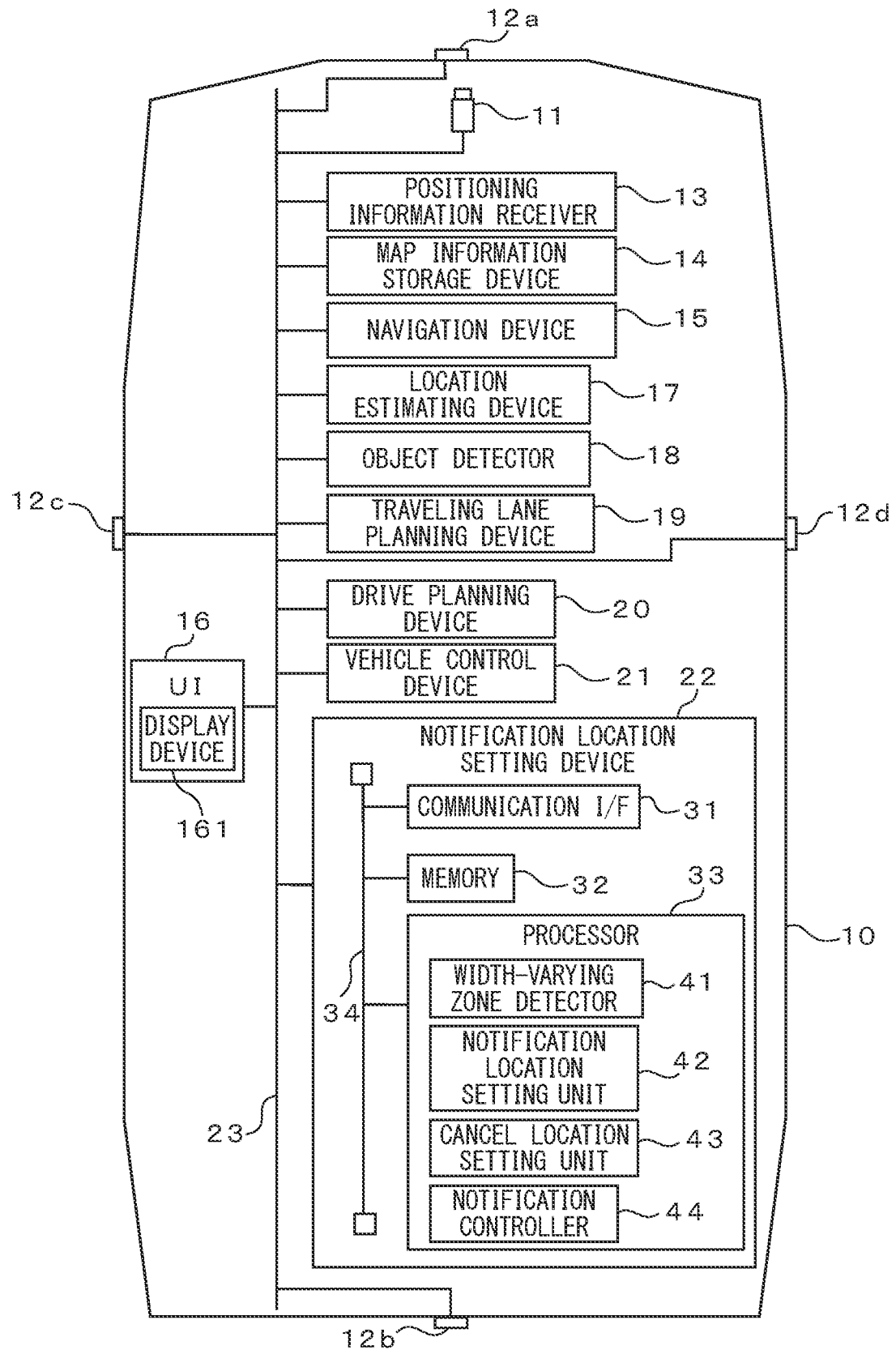
FIG. 2 is a general schematic drawing of a vehicle in which a notification location setting device is mounted.

FIG. 2 is a general schematic drawing of a vehicle 10 in which a notification location setting device 22 is mounted. The vehicle 10 has a camera 11, LiDAR sensors 12a to 12d, a positioning information receiver 13, a map information storage device 14, a navigation device 15, a user interface (UI) 16, a location estimating device 17, an object detector 18, a traveling lane planning device 19, a drive planning device 20, a vehicle control device 21 and a notification location setting device 22.

The camera 11, LiDAR sensors 12a to 12d, positioning information receiver 13, map information storage device 14, navigation device 15, UI 16, location estimating device 17, object detector 18, traveling lane planning device 19, drive planning device 20, vehicle control device 21 and notification location setting device 22 are connected in a communicable manner through an in-vehicle network 23 that conforms to controller area network standards.

The camera 11 is an example of an imaging unit provided in the vehicle 10. The camera 11 is mounted inside the vehicle 10 and directed toward the front of the vehicle 10. The camera 11, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 11 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 11 outputs the camera image and the camera image photograph time at which the camera image was taken, through the in-vehicle network 23 to the location estimating device 17 and object detector 18. The camera image is also used for processing at the location estimating device 17 to estimate the location of the vehicle 10. At the object detector 18, the camera image is used for processing to detect other objects surrounding the vehicle 10.

The LiDAR sensors 12a to 12d are mounted on the outer sides of the vehicle 10, for example, being directed toward the front, the left, the rear and the right of the vehicle 10, respectively. The LiDAR sensors 12a to 12d respectively synchronize and emit a pulsed laser ahead, to the left, behind and to the right of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the laser has been emitted. Each of the LiDAR sensors 12a to 12d outputs the reflected wave information that includes the laser emission direction and the time required for the reflected wave to return, together with the reflected wave information acquisition time at which the laser was emitted, through the in-vehicle network 23 to the object detector 18. At the object detector 18, the reflected wave information is used for processing to detect other objects surrounding the vehicle 10.

The positioning information receiver 13 outputs positioning information that represents the current location of the vehicle 10. The positioning information receiver 13 may be a GNSS receiver, for example. The positioning information receiver 13 outputs positioning information and the positioning information acquisition time at which the positioning information has been acquired, to the map information storage device 14, navigation device 15 and location estimating device 17, each time positioning information is acquired at a predetermined receiving cycle.

The map information storage device 14 stores wide-area map information for a relatively wide area (an area of 10 to 30 km$^2$, for example) that includes the current location of the vehicle 10. The wide-area map information preferably has high precision map information including three-dimensional information for the road surface, information for the types and locations of structures and road features such as road lane marking lines, and the legal speed limit for the road. The map information storage device 14 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 13, the map information storage device 14 refers to the stored wide-area map information and outputs map information for a relatively narrow area including the current location represented by the positioning information (for example, an area of 100 m to 10 km$^2$), through the in-vehicle network 23 to the location estimating device 17, the traveling lane planning device 19, the drive planning device 20 and the notification location setting device 22.

Based on the navigation map information, the destination location of the vehicle 10 input through the UI 16, and positioning information representing the current location of the vehicle 10 input from the positioning information receiver 13, the navigation device 15 creates a traveling route from the current location to the destination location of the vehicle 10. The traveling route includes information relating to the locations of right turns, left turns, merging and branching. When the destination location has been newly set or the current location of the vehicle 10 has exited the traveling route, the navigation device 15 creates a new traveling route for the vehicle 10. Every time a traveling route is created, the navigation device 15 outputs the traveling route to the location estimating device 17 via the in-vehicle network 23.

The UI 16 is an example of the notification unit. The UI 16, controlled by the navigation device 15 and notification location setting device 22, notifies the driver of the vehicle 10 traveling information and a control switching request for switching of operation of the vehicle from automatic control to manual control. The UI 16 also creates an operation signal in response to operation of the vehicle 10 by the driver. The traveling information of the vehicle 10 includes information relating to the location of the vehicle and the current and future route of the vehicle, such as the traveling route. The UI 16 has a display device 161 such as a liquid crystal display or touch panel, for display of the traveling information and control switch notification. The UI 16 also has a touch panel or operating button, for example, as an input device for inputting operation information from the driver to the vehicle 10. The operation information may be, for example, a destination location, transit points, vehicle speed and other vehicle control information, as well as the response of the driver to the control switch notification. The UI 16 notifies the navigation device 15 and the drive planning device 20 of the input operation information, via the in-vehicle network 23.

The location estimating device 17 estimates the location of the vehicle 10 at the camera image photograph time, based on the road features surrounding the vehicle 10 represented in the camera image. For example, the location estimating device 17 compares lane marking lines identified in the camera image with lane marking lines represented in the map information input from the map information storage device 14, and determines the estimated location and estimated declination of the vehicle 10 at the camera image photograph time. The location estimating device 17 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 17 gives notification of this information to the object detector 18, traveling lane planning device 19, drive planning device 20, vehicle control device 21 and notification location setting device 22.

The object detector 18 detects other objects around the vehicle 10 and their types (for example, vehicles) based on the camera image and reflected wave information. Other objects also include other vehicles traveling around the vehicle 10. The object detector 18 tracks other detected objects and determines the trajectories of the other objects. In addition, the object detector 18 identifies the traveling lanes in which the other objects are traveling, based on the lane marking lines represented in the map information and the locations of the objects. The object detector 18 notifies the traveling lane planning device 19 and drive planning device 20 of information representing the types of other objects that were detected, information indicating their locations, and also their traveling lanes.

At a traveling lane-planning creation time set in a predetermined cycle, the traveling lane planning device 19 selects a traffic lane on the road on which the vehicle 10 is traveling, within the nearest driving zone (for example, 10 km) selected from the traveling route as input from the navigation device 15, based on the map information, the traveling route and surrounding environment information and the current location of the vehicle 10, and creates a traveling lane plan representing the scheduled traveling lane for traveling of the vehicle 10. For example, the traveling lane planning device 19 creates a traveling lane plan for the vehicle 10 to travel on a traffic lane other than a passing traffic lane. Each time a traveling lane plan is created, the traveling lane planning device 19 notifies the drive planning device 20 of the traveling lane plan.

Based on the map information, the traveling route and the current location of the vehicle 10, the traveling lane planning device 19 also assesses whether or not the vehicle 10 is entering (merging with) another road merging ahead, from the traveling road on which it is currently traveling, and the need for a lane change, within the nearest driving zone selected from the traveling route. When it has been assessed that the vehicle 10 is entering another road merging ahead from the traveling road, the traveling lane planning device 19 gives the notification location setting device 22 a merge notification indicating the merging location included in the nearest driving zone. The traveling lane planning device 19 may further utilize surrounding environment information or vehicle status information for assessment of the presence or absence of merging, and whether or not a lane change is necessary. The surrounding environment information includes the locations and speeds of other vehicles traveling around the vehicle 10. The vehicle status information includes the current location of the vehicle 10, and the vehicle speed, acceleration and traveling direction.

At a driving plan creation time set with a predetermined cycle, the drive planning device 20 creates a driving plan representing the scheduled traveling trajectory of the vehicle 10 up until a predetermined time (for example, 5 seconds), based on the map information, the traveling lane plan, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. When the traveling lane plan includes a lane change wherein the vehicle 10 is to move between traffic lanes, the drive planning device 20 creates a driving plan that includes the lane change, in such a manner that a predetermined distance can be ensured between the vehicle 10 and other vehicles. When the traveling lane plan includes a lane change wherein the vehicle 10 is to move between traffic lanes, but a predetermined distance cannot be ensured between the vehicle 10 and another vehicle, the drive planning device 20 creates a driving plan for traveling in the current traffic lane. The drive planning device 20 notifies the vehicle control device 21 and notification location setting device 22 of the driving plan for each driving plan created.

The vehicle control device 21 controls each unit of the vehicle 10 based on the location of the vehicle 10 and the vehicle speed and yaw rate, as well as on the driving plan, so that the vehicle 10 travels along the traveling route. For example, the vehicle control device 21 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 21 also outputs a control signal corresponding to a set steering amount, to an actuator (not shown) that controls the steering wheel for the vehicle 10.

The vehicle control device 21 also determines the amount of fuel injection according to a set accelerator level, and outputs a control signal corresponding to the amount of fuel injection to a drive unit (not shown) of the engine of the vehicle 10. Alternatively, the vehicle control device 21 may output a control signal corresponding to a set brake level to the brake (not shown) of the vehicle 10.

The vehicle control device 21 has an automatic control operating mode in which the vehicle 10 is operated by automatic control as described above, and a manual control operating mode in which the driver operates the vehicle 10 manually. When the driver has acknowledged the notification of control switching from automatic control to manual control, the vehicle control device 21 switches operation of the vehicle 10 from the currently applied automatic control operating mode to manual control operating mode. This allows the driver to operate the vehicle 10 by manual control for the lane change. In the manual control operating mode, at least one operation of the vehicle 10 from among driving, braking and steering is controlled manually. Each time the operating mode is changed, the vehicle control device 21 notifies the notification location setting device 22 of the operating mode after the change.

All or some of the functions of the location estimating device 17, object detector 18, traveling lane planning device 19, drive planning device 20 and vehicle control device 21 are carried out by functional modules executed by a computer program operating on a processor, for example. Alternatively, all or some of the functions of the location estimating device 17, object detector 18, traveling lane planning device 19, drive planning device 20 and vehicle control device 21 may be carried out by specialized computing circuits. The location estimating device 17, object detector 18, traveling lane planning device 19, drive planning device 20, vehicle control device 21 and notification location setting device 22 were explained above as separate devices, but all or some of them may be constructed in a single device.

When a merging location is included in the traveling route, the notification location setting device 22 carries out width-varying zone detection processing whereby it detects the width-varying zone in which the width of the traveling road varies before the merging location between the current location of the vehicle 10 and the merging location. Furthermore, when a merging location is included in the traveling route, the notification location setting device 22 carries out notification location setting processing whereby it sets on the traveling road a notification location where the driver is to be notified of a control switching request for switching operation of the vehicle 10 from automatic control to manual control, based on the shape of the width-varying zone where the width of the traveling road varies before the merging location. The notification location setting device 22 also carries out cancel location setting processing whereby it sets an automatic control cancel location where operation of the vehicle 10 is to be forcibly switched from automatic control to manual control, based on the notification location. When the vehicle 10 was not entering another road at the notification location, the notification location setting device 22 also carries out notification control processing whereby it notifies the driver of a control switching request at the notification location, via the UI 16. For this purpose, the notification location setting device 22 has a communication interface (IF) 31, a memory 32 and a processor 33. The communication interface 31, memory 32 and processor 33 are connected via signal wires 34.

The communication IF 31 is an example of an in-vehicle communication unit, and it has an interface circuit to connect the notification location setting device 22 with the in-vehicle network 23. That is, the communication IF 31 is connected with the camera 11, LiDAR sensors 12a to 12d, positioning information receiver 13, map information storage device 14, navigation device 15, UI 16, location estimating device 17, object detector 18, traveling lane planning device 19, drive planning device 20 and vehicle control device 21, via the in-vehicle network 23.

The memory 32 is an example of a memory unit, and it has a volatile semiconductor memory and a non-volatile semiconductor memory, for example. The memory 32 stores an application computer program and various data to be used for information processing carried out by the processor 33 of the notification location setting device 22.

The processor 33 comprises one or more CPUs (Central Processing Units) and their peripheral circuits. The processor 33 may also have other computing circuits such as a logical operation unit, numerical calculation unit or graphic processing unit. When the processor 33 has multiple CPUs, it may have a separate memory for each CPU. The processor 33 carries out width-varying zone detection processing, notification location setting processing, cancel location setting processing and notification control processing.

The processor 33 comprises a width-varying zone detector 41 that carries out the width-varying zone detection processing, a notification location setting unit 42 that carries out the notification location setting processing, a cancel location setting unit 43 that carries out the cancel location setting processing and a notification controller 44 that carries out the notification control processing. Each of the units of the processor 33 are functional modules driven by a computer program operating on the processor 33, for example. Alternatively, each of the units of the processor 33 may be specialized computing circuits in the processor 33.

FIG. 3 is an example of an operation flow chart for the notification location setting device 22. Processing for setting of the notification location and automatic control cancel location by the notification location setting device 22 will now be explained with reference to FIG. 3. While the vehicle 10 travels, the notification location setting device 22 repeatedly carries out processing for setting of the notification location and automatic control cancel location according to the operation flow chart shown in FIG. 3. In the following explanation, the traveling road on which the vehicle 10 is traveling is considered to be the acceleration lane road, and the other road where the traveling road merges at the merging location is considered to be the main lane road of the high-speed road. The traveling road may also be a side road, and the other road where the traveling road merges at the merging location may be a general road.

First, the width-varying zone detector 41 of the processor 33 of the notification location setting device 22 assesses whether or not a merge notification has been received from the traveling lane planning device 19 (step S101). When no merge notification has been received (step S101—No), processing by the notification location setting device 22 returns back to before step S101.

When a merge notification has been received (step S101—Yes), the width-varying zone detector 41 refers to map information input from the map information storage device and detects the width-varying zone in which there is variation in the width of the acceleration lane road before the merging location between the current location of the vehicle 10 and the merging location (step S102). The width-varying zone detector 41 also detects the zone between the start location and the end location, as the width-varying zone. The width-varying zone detector 41 notifies the notification location setting unit 42 of information representing the location of the detected width-varying zone. The details regarding the width-varying zone detection processing in step S102 will be described below.

Next, the notification location setting unit 42 of the processor 33 of the notification location setting device 22 sets the notification location where the driver is to be notified of a control switching request on the acceleration lane road, based on the shape of the width-varying zone, when the vehicle 10 was not entering the main lane road by automatic control (step S103). Specifically, the notification location setting unit 42 sets the notification location on the acceleration lane road so that it is further away from the merging location with a smaller degree of decrease in the width of the width-varying zone of the acceleration lane road toward the merging location. The notification location setting unit 42 notifies the cancel location setting unit 43 and the notification controller 44 of the notification location. The details regarding notification location setting processing in step S103 will be described below.

Next, the cancel location setting unit 43 of the processor 33 of the notification location setting device 22 sets the automatic control cancel location where operation of the vehicle 10 is to be forcibly switched from automatic control to manual control, based on the notification location set in step S103 (step S104). The cancel location setting unit 43 also notifies the notification controller 44 of the automatic control cancel location, thus completing the series of processing steps. The details regarding cancel location setting in step S104 will be described below. Based on the processing shown in FIG. 3, the notification location setting device 22 can set a notification location (corresponding to P5 in FIG. 1A and Q5 in FIG. 1B) and a cancel location (corresponding to P6 in FIG. 1A and Q6 in FIG. 1B).

Figure 4A:
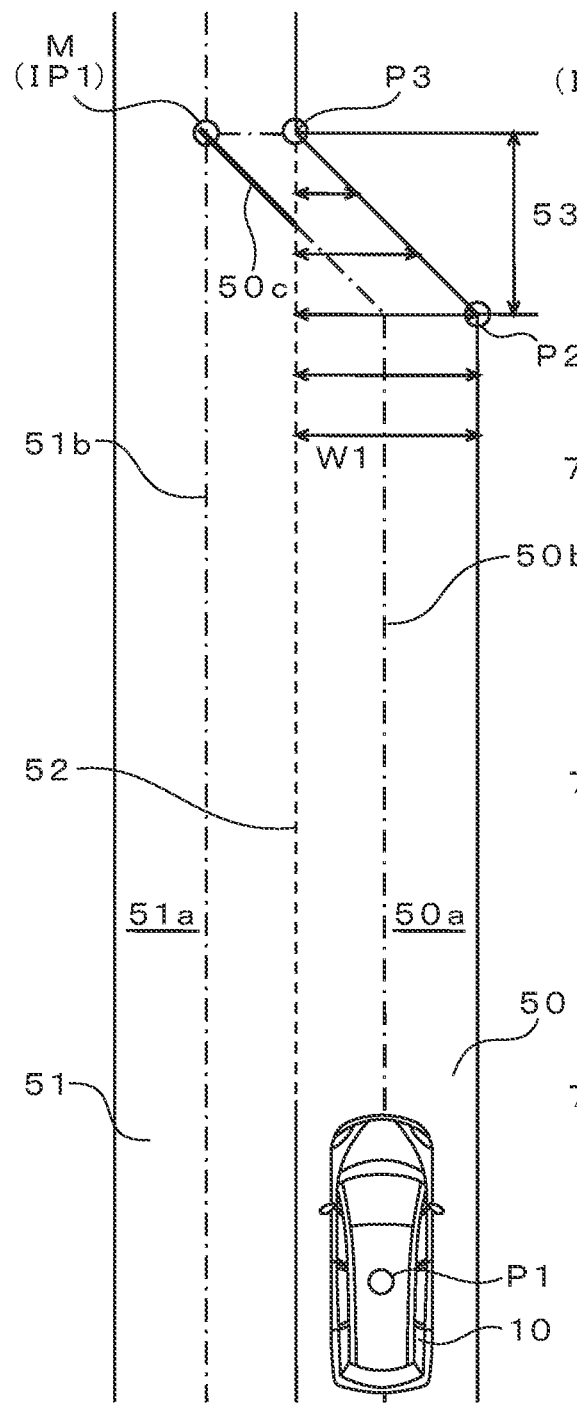
FIG. 4A is a diagram illustrating processing by a width-varying zone detector and merging location setting unit.
Figure 4B:
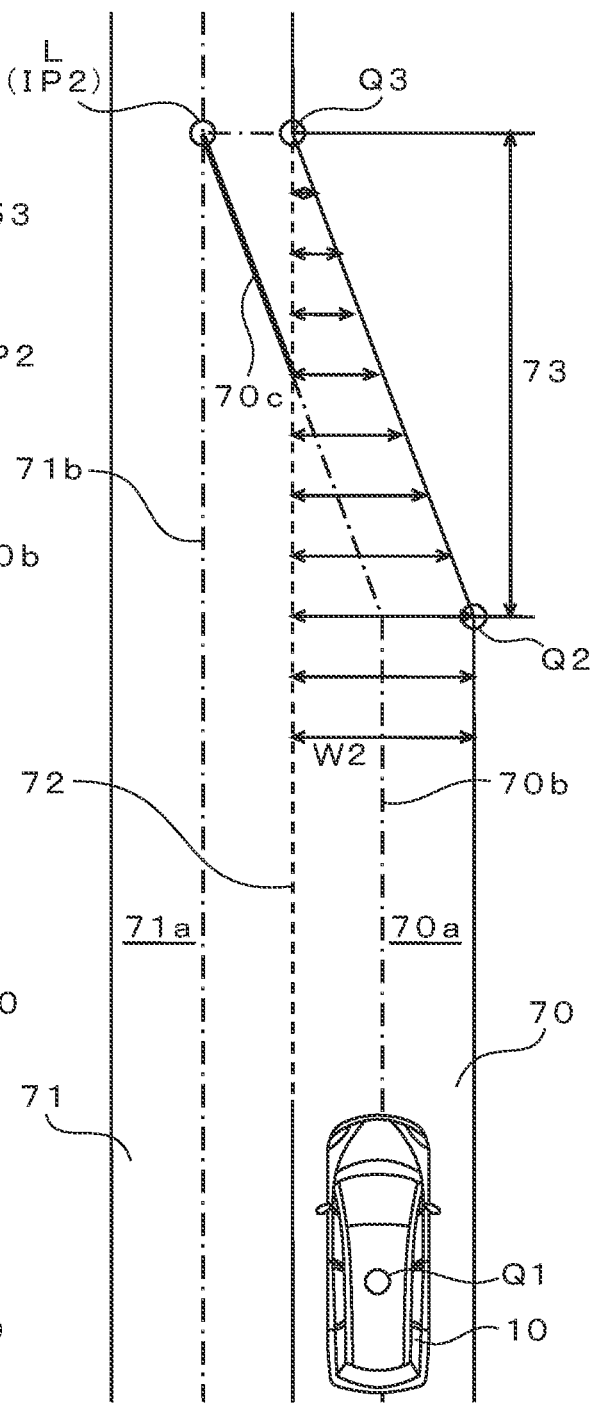
FIG. 4B is a diagram illustrating processing by a width-varying zone detector and merging location setting unit.

The following is a detailed description of an example of width-varying zone detection processing by the width-varying zone detector 41 in step S102 of FIG. 3. FIG. 4A and FIG. 4B are diagrams illustrating processing by the width-varying zone detector 41. FIG. 4A corresponds to the example illustrated in FIG. 1A, and FIG. 4B corresponds to the example illustrated in FIG. 1B.

In the example illustrated in FIG. 4A, the width-varying zone detector 41 first refers to the map information, and detects a location where the width W1 of the acceleration lane road 50 begins to vary before the merging location M, between the current location P1 of the vehicle 10 and the merging location M, as the start location of the width-varying zone P2.

The width-varying zone detector 41 then refers to the map information and detects the center line 50b of the acceleration lane road 50 which includes the zone between the merging location M and start location P2, and the center line 51b of the main lane road 51.

The width-varying zone detector 41 then determines the intersection IP1 between an extension line 50c which is the extension from the center line 50b into the main lane road 51, and the center line 51b of the main lane road 51, and detects the location on the acceleration lane road 50 alongside the intersection IP1 as the end location of the width varying zone P3. Finally, the width-varying zone detector 41 detects the width varying zone 53 based on the start location P2 and the end location P3.

In the example shown in FIG. 4B as well, similar to the method described above, the width-varying zone detector 41 detects a start location of the width-varying zone Q2, detects an end location Q3 from the intersection IP2 between the extension line 70c and the center line 71b of the main lane road 71, and detects a width varying zone 73 based on the start location Q2 and end location Q3.

An example of notification location setting processing by the notification location setting unit 42 in step S103 of FIG. 3 will be explained in detail below. FIG. 5A and FIG. 5B are diagrams illustrating processing by a notification location setting unit 42. FIG. 5A corresponds to the example illustrated in FIG. 1A, and FIG. 5B corresponds to the example illustrated in FIG. 1B.

In the example shown in FIG. 5A, the notification location setting unit 42 first refers to the map information, and sets on the acceleration lane road 50 a split location P4 which splits the width varying zone 53 into a zone A1 on the side opposite from the current location P1 of the vehicle 10 and a zone B1 on the side of the current location P1 of the vehicle 10, along the direction in which the acceleration lane road 50 extends. The split location P4 is set in the width varying zone 53 so as to guarantee a width allowing the vehicle 10 to travel, in the acceleration lane road 50 further toward the vehicle 10 side than the split location P4. For example, the width varying zone 53 may have the zone A1 and zone B1 split in a proportion of 5:5.

The notification location setting unit 42 then sets the notification location P5 based on the split location P4. For example, the notification location setting unit 42 sets the notification location P5 to be the location toward the current location P1 of the vehicle 10 by a predetermined distance C1 (for example, 100 m to 150 m) from the split location P4. The notification location setting unit 42 may also set the notification location P5 based on the distance between the split location P4 and the current location P1 of the vehicle 10, and on the nearest average value for the speed of the vehicle 10. The notification location setting unit 42 may also set the notification location P5 to be the location from where it is estimated that the vehicle 10 will reach the split location P4 at a predetermined time.

In the example shown in FIG. 5B as well, similar to the method described above, the notification location setting unit 42 refers to the map information and sets the split location Q4, and then sets the notification location Q5 based on the split location Q4. The ratio between zone A2 and zone B2 used to determine the split location Q4, and the predetermined distance C2 from the split location Q4 to the notification location Q5, are the same distances as for C1 in FIG. 5A.

Since, in comparing FIG. 5A and FIG. 5B, the degree of decrease in the width varying zone 73 toward the merging location is smaller than that of the width varying zone 53, the notification location Q5 is set further away from the merging locations M, L than the notification location P5. Therefore, when the degree of decrease in the width of the width-varying zone toward the merging location is small, the driver is notified of the control switching request earlier than when it is not small. Since the notification location P5 is set at a location further from the current location of the vehicle 10 than the notification location Q5, the driver is notified of the control switching request later.

In the example shown in FIG. 5A, the distance of the zone D1 between the start location P2 of the width varying zone 53 and the notification location P5 is relatively long, and therefore when the driver of the vehicle 10 is notified of the control switching request at notification location P5, the driver has sufficient time to control the vehicle 10 by manual control for entry to the main lane road 51. In the example shown in FIG. 5B, even if the driver of the vehicle 10 is notified of the control switching request at notification location P5, the distance between the start location Q2 of the width varying zone 73 and the notification location P5 is relatively short. The driver may therefore feel that there is not sufficient time to control the vehicle 10 by manual control for entry to the main lane road.

The notification location setting unit 42 sets the notification location Q5 so that the distance zone between the start location Q2 of the width varying zone 73 and the notification location P5 is relatively longer. Thus, the driver notified of the control switching request at notification location Q5 can feel that there is sufficient time to control the vehicle 10 by manual control for entry to the main lane road.

An example of cancel location setting processing by the cancel location setting unit 43 in step S104 of FIG. 3 will be explained in detail below. FIG. 6A and FIG. 6B are diagrams illustrating processing by a cancel location setting unit 43. FIG. 6A corresponds to the example illustrated in FIG. 1A, and FIG. 6B corresponds to the example illustrated in FIG. 1B.

In the example shown in FIG. 6A, the cancel location setting unit 43 sets the automatic control cancel location P6 to be a location on the acceleration lane road 50 toward the end location P3 by a predetermined distance E1 (for example, 50 m to 100 m) from the notification location P5. The cancel location setting unit 43 may also set the automatic control cancel location P6 to be a location where it is estimated that the vehicle 10 will be from the notification location P5 at a predetermined time, based on the most recent average value for the speed of the vehicle 10.

In the example shown in FIG. 6B as well, similar to the method described above, the cancel location setting unit 43 sets the automatic control cancel location Q6 to be a location on the acceleration lane road 50 toward the end location Q3 by a predetermined distance E2 (for example, 50 m to 100 m) from the notification location Q5. The cancel location setting unit 43 may also set the automatic control cancel location Q6 to be a location where it is estimated that the vehicle 10 will be from the notification location Q5 at a predetermined time, based on the most recent average value for the speed of the vehicle 10. The predetermined distance E2 is the same distance as the distance E1 in the example of FIG. 6A.

Figure 7:
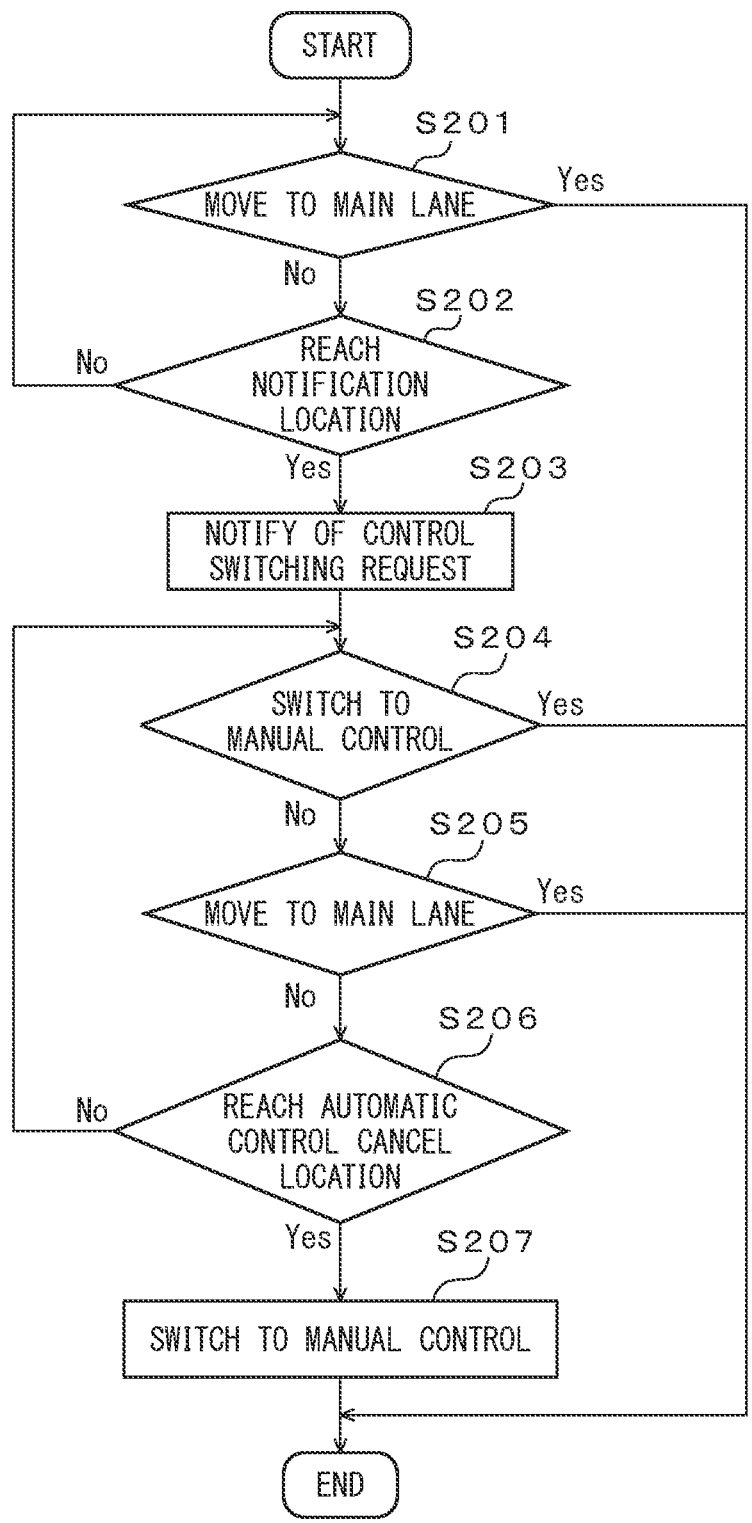
FIG. 7 is an operation flow chart for a notification location setting device (2).

FIG. 7 is an example of an operation flow chart for the notification location setting device 22. Notification control processing by the notification location setting device 22 after the notification location and automatic control cancel location have been set will now be explained with reference to FIG. 6A, FIG. 6B and FIG. 7. After the notification location and automatic control cancel location have been set, the notification location setting device 22 carries out notification control processing according to the operation flow chart shown in FIG. 7.

First, the notification controller 44 of the processor 33 of the notification location setting device 22 compares the traveling lane plan and the traveling lane of the vehicle 10 and assesses whether or not movement of the vehicle 10 to the main lane has been completed as planned by the traveling lane plan (step S201). When movement of the vehicle 10 to the main lane along the scheduled traveling trajectory 61, 81 for the lane change has been completed before notification locations P5, Q5 (step S201—Yes), as indicated by the arrows in FIG. 6A and FIG. 6B, notification control processing by the notification location setting device 22 is complete.

When movement of the vehicle 10 to the main lane has not been completed (step S201—No), on the other hand, i.e. when the vehicle 10 has not entered the main lane road from the acceleration lane road, the notification controller 44 assesses whether or not the vehicle 10 has reached the notification location (step S202). The notification controller 44 refers to the map information and assesses whether or not the vehicle 10 has reached the notification location, based on the current location of the vehicle 10 and the notification location. When the vehicle 10 has not reached the notification location P5, Q5 (step S202—No), processing by the notification location setting device 22 returns back to before step S201.

When the vehicle 10 has not entered the main lane road from the acceleration lane road and the vehicle 10 has reached the notification location P5, Q5 (step S202—Yes), the notification controller 44 notifies the driver of the control switching request using the UI 16 (step S203). For example, the notification controller 44 uses the display device 161 of the UI 16 to display that the vehicle 10 could not execute the lane change at an appropriate timing by automatic control, and a request for control switching. As a result, the driver operates the UI 16 in response to the request for control switching to switch to manual control operating mode, and begins operation of the vehicle. However, the request for control switching may be overlooked in some cases, creating a situation where switch to manual control operating mode is not made.

The notification controller 44 then assesses whether or not the operating mode for the vehicle control device 21 has been switched to manual control operating mode (step S204). When the current operating mode notified from the vehicle control device 21 is manual control operating mode, the notification controller 44 assesses that switch has been made to manual control operating mode (step S204—Yes), and notification control processing by the notification location setting device 22 is completed.

When the current operating mode notified from the vehicle control device 21 is automatic control operating mode, on the other hand, the notification controller 44 assesses that switch has not been made to manual control operating mode. (Step S204—No).

When it has been assessed that switch has not been made to manual control operating mode, the notification controller 44 compares the traveling lane plan and the traveling lane of the vehicle 10, and assesses whether or not movement of the vehicle 10 to the main lane has been completed (step S205). When movement of the vehicle 10 to the main lane along the scheduled traveling trajectory 62, 82 for the lane change has been completed (step S205—Yes), as indicated by the arrows in FIG. 6A and FIG. 6B, the notification controller 44 completes notification control processing by the notification location setting device 22.

When movement of the vehicle 10 to the main lane has not been completed (step S205—No), on the other hand, i.e. when the vehicle 10 has not entered the main lane road from the acceleration lane road, the notification controller 44 assesses whether or not the vehicle 10 has passed through the automatic control cancel location P6, Q6 (step S206). The notification controller 44 refers to the map information and assesses whether or not the vehicle 10 has reached the automatic control cancel location, based on the current location of the vehicle 10 and the automatic control cancel location P6, Q6. When the vehicle 10 has not reached the automatic control cancel location P6, Q6 (step S206—No), processing by the notification location setting device 22 returns back to before step S204.

When switch has not been made to manual control operating mode and the vehicle 10 has reached the automatic control cancel location P6, Q6 (step S206—Yes), the vehicle 10 makes an operating mode switch from automatic control operating mode to manual control operating mode (step S207). Specifically, the notification controller 44 notifies the vehicle control device 21 of the control switching request, and the vehicle control device 21 switches the operating mode from automatic control operating mode to manual control operating mode according to the notification of the control switching request from the notification controller 44. The notification controller 44 also notifies the driver that control of the vehicle 10 has been switched from automatic control to manual control, by display using the display device 161 of the UT 16. The driver may operate the vehicle 10 in manual control operating mode for a lane change or stopping the vehicle 10 on the acceleration lane road responding to conditions surrounding the vehicle 10, which may include.

As explained above, when a merging location where the traveling road on which the vehicle 10 is traveling is to merge with another road is included on the traveling route toward the destination location of the vehicle 10, the notification location setting device sets on the traveling road a notification location where the driver is to be notified of a control switching request for switching operation of the vehicle 10 from automatic control to manual control, based on the shape of the width-varying zone where the width of the traveling road varies before the merging location. When the vehicle 10 was not entering another road at the notification location, the notification location setting device notifies the driver of a control switching request via the notification unit. Since the notification location setting device sets the notification location where notification is made of a control switching request for change of operation of the vehicle from automatic control to manual control based on the shape of the traveling road before the merging location, the driver is able to receive the control switching request with a sufficient amount of time to spare.

Figure 8A:
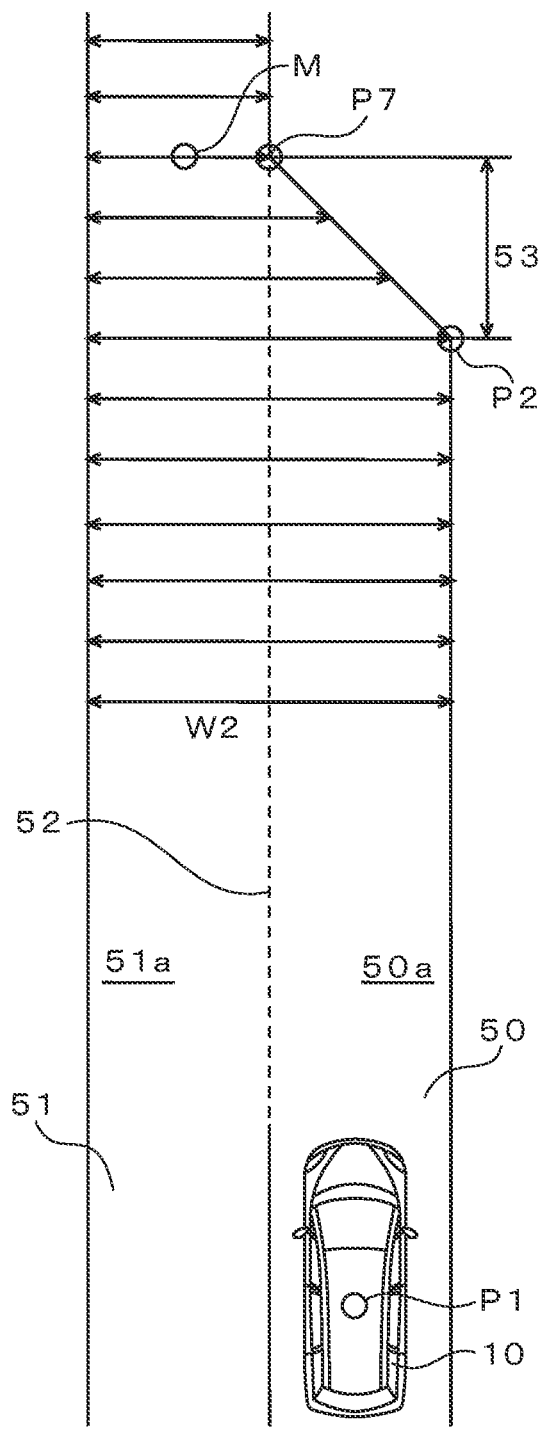
FIG. 8A is a diagram illustrating processing by a merging location setting unit.
Figure 8B:
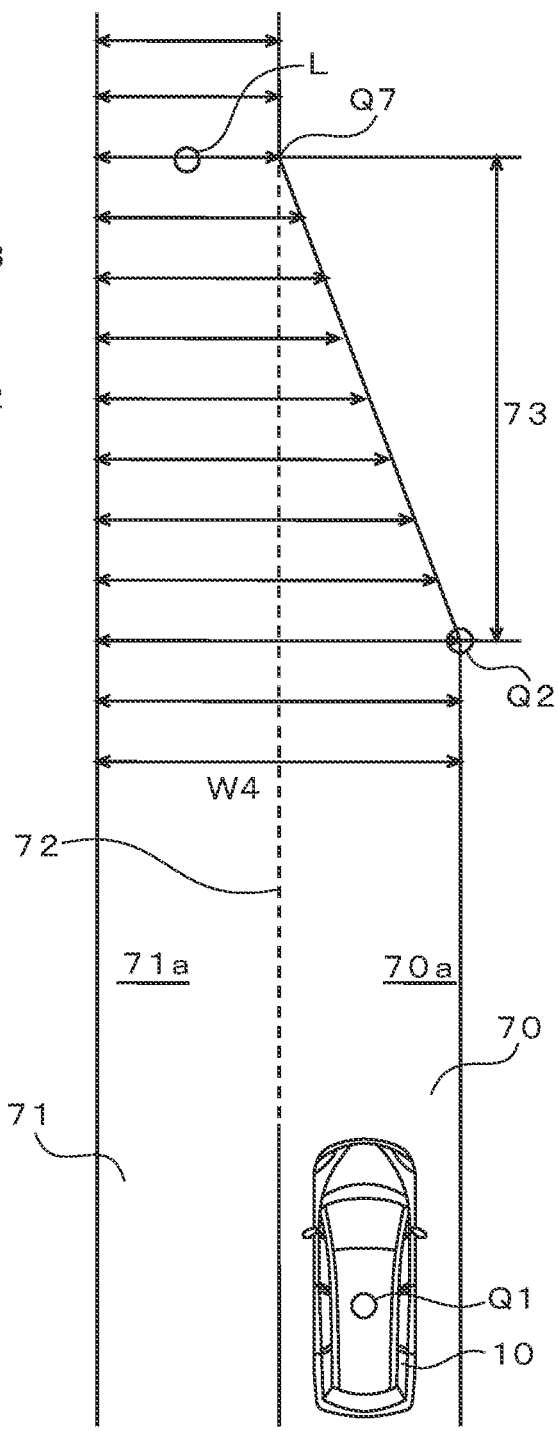
FIG. 8B is a diagram illustrating processing by a merging location setting unit.

FIG. 8A and FIG. 8B are diagrams illustrating different processing by a width-varying detector 41. FIG. 8A corresponds to the example illustrated in FIG. 1A, and FIG. 8B corresponds to the example illustrated in FIG. 1B. The processing in step S102 of FIG. 3 was explained using FIG. 4, but in FIG. 8 a different method is used to detect the width varying zone. It is also possible to use different processing for the operation flow chart of FIG. 3, as described below.

In the example illustrated in FIG. 8A, the width-varying detector 41 refers to map information to continuously determine a value W2 as the sum of the width of the acceleration lane road 50 and the width of the main lane road 51 along a direction toward the merging location M from the current location P1 of the vehicle 10, in a predetermined range from the current location P1 of the vehicle 10 to beyond the merging location M. Before and after the merging location M, the width-varying detector 41 detects a region where the value of W2 varies in a decreasing manner after having exhibited a fixed value within a prescribed range, and then exhibits a fixed value in a prescribed range. The width-varying detector 41 sets the end point of the zone where the value of W2 varies in a decreasing manner, as the end location of the width varying zone P7. Since the width of the main lane road 51 is assumed to be essentially constant, the end point of the zone in which the value W2 varies in a decreasing manner can be considered to be the location where the width of the acceleration lane road 50 has decreased to zero in the traveling direction of the vehicle 10, or in other words, the end location of the width varying zone.

In the example illustrated in FIG. 8B, similar to the method described above, the width-varying detector 41 refers to map information to continuously determine a value W4 as the sum of the width of the acceleration lane road 50 and the width of the main lane road 71 along a direction toward the merging location L from the current location Q1 of the vehicle 10, in a predetermined range from the current location Q1 of the vehicle 10 to beyond the merging location L. The width-varying detector 41 detects a region where the value of W4 varies in a decreasing manner after having exhibited a fixed value within a prescribed range, and then exhibits a fixed value in a prescribed range. The width-varying detector 41 sets the end point of the zone where the value of W4 varies in a decreasing manner, as the end location of the width varying zone Q7.

Incidentally, the width-varying detector 41 may determine the values W2 and W4 using a lane marking line detected based on a camera image, instead of using the map information.

Figure 9A:
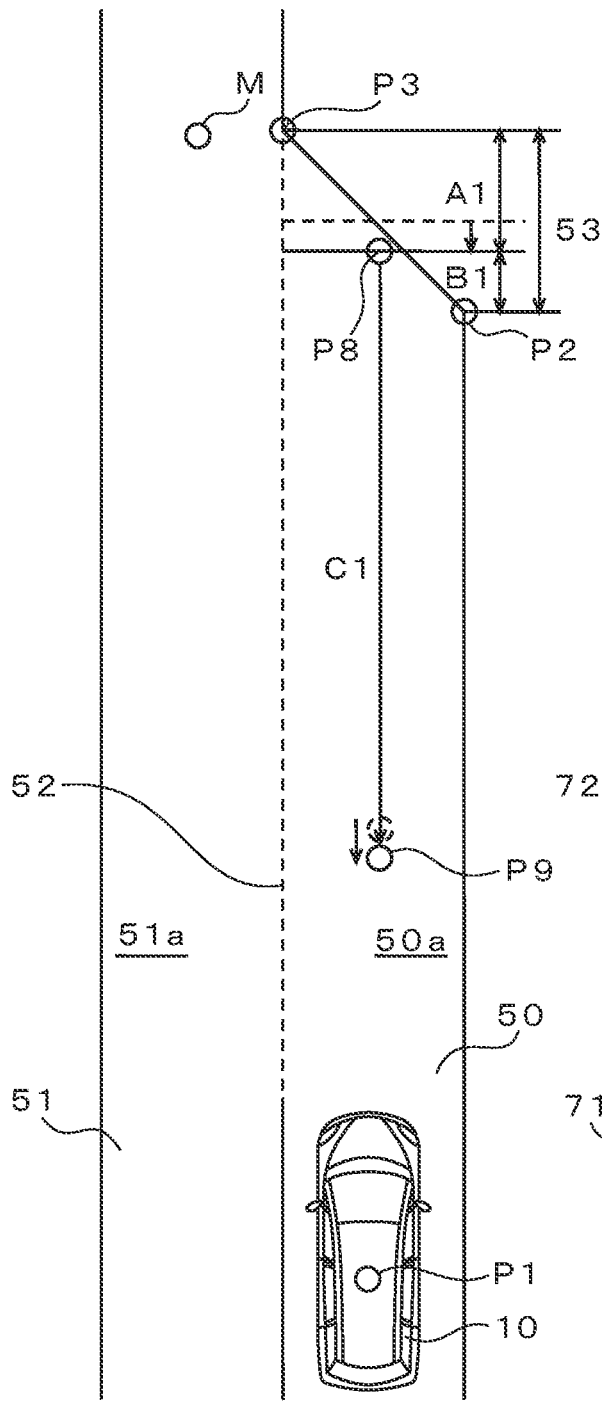
FIG. 9A is a diagram illustrating processing by a notification location setting unit.
Figure 9B:
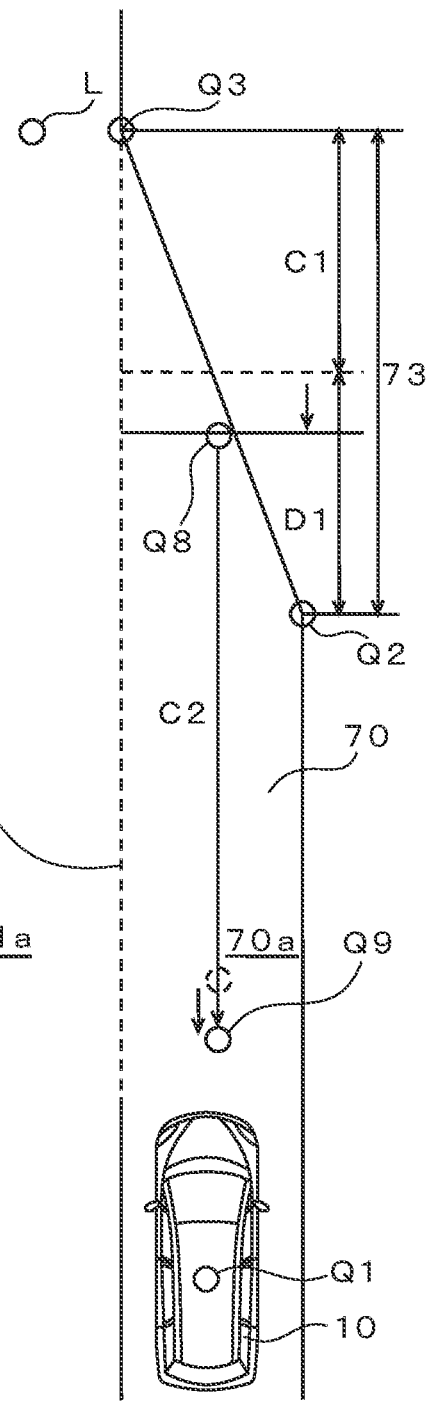
FIG. 9B is a diagram illustrating processing by a notification location setting unit.

FIG. 9A and FIG. 9B are diagrams illustrating different processing by a notification location setting unit 42. FIG. 9A corresponds to the example illustrated in FIG. 1A, and FIG. 9B corresponds to the example illustrated in FIG. 1B. The processing in step S103 of FIG. 3 was explained using FIG. 5, but in FIG. 9 a different method is used to set the notification location. It is possible to use different processing for the operation flow chart of FIG. 3, as described below.

In the example illustrated in FIG. 9A, the notification location setting unit 42 refers to the map information and assesses whether or not a structure of a predetermined height is present alongside the width varying zone 53. Structures include, for example, side walls with heights of 1.5 m or greater. When a structure of the predetermined height is present, the notification location setting unit 42 sets the split location of the width varying zone 53 on the acceleration lane road 50 so as to be further away from the merging location M, than when no structure of at least the predetermined height is present alongside the width-varying zone. When no structure of the predetermined height is present, the notification location setting unit 42 changes the 5:5 ratio of division of the width varying zone 53 into zone A1 and zone B1, to 7:3, for example. The ratio used may be a different value, and it may vary depending on the height of the structure. The notification location setting unit 42 sets split location P8 as the location where the width varying zone 53 is divided at 7:3, and sets the notification location P9 based on the split location P8.

In the example illustrated in FIG. 9B as well, similar to the method described above, the notification location setting unit 42 refers to the map information and assesses whether or not a structure of a predetermined height is present alongside the width varying zone 73. When a structure of the predetermined height is present, the notification location setting unit 42 sets the split location of the width varying zone 53 on the acceleration lane road 70 so as to be further away from the merging location L, than when no structure of at least the predetermined height is present alongside the width-varying zone. When no structure of the predetermined height is present, the notification location setting unit 42 changes the 5:5 ratio of division of the width varying zone 73 into zone A2 and zone B2, to 7:3, for example. The ratio used may be a different value, and it may vary depending on the height of the structure. The notification location setting unit 42 sets split location Q8 as the location where the width varying zone 53 is divided at 7:3, and sets the notification location Q9 based on the split location Q8.

When a structure of a predetermined height is present alongside the width-varying zone, the driver can potentially feel a sense of pressure from a visual standpoint. When notified of a control switching request while under a sense of pressure from a visual standpoint, the driver may experience increased psychological tension. Therefore, when a structure of a predetermined height is present alongside the width-varying zone, the notification location setting unit 42 sets the notification location on the acceleration lane road so that it is further from the merging location, by changing the split location so as to be closer to the current location of the vehicle 10. This allows the driver to receive the notification of the control switching request at a location that reduces the sense of pressure from a visual standpoint, even when a structure of a predetermined height is present alongside the width-varying zone.

Incidentally, the notification location setting unit 42 may assess whether or not a structure of a predetermined height is present alongside the width varying zone 53, 73 based on a camera image, instead of map information.

For the purpose of the invention, the notification location setting device, computer program for notification location setting and notification location setting method according to the embodiment described above may incorporate appropriate modifications that are still within the gist of the invention. Moreover, the technical scope of the invention is not limited to this embodiment, and includes the invention and its equivalents as laid out in the Claims.

For example, the width-varying zone detector of the embodiment described above detected the center line of the acceleration lane road and the center line of the main lane road. However, since the road may have a shoulder in addition to the traffic lanes, the width-varying zone detector may detect the center line of the acceleration lane and the center line of the main lane and may detect the end location of the width varying zone based on their intersection.

The invention claimed is:

1. A notification location setting device comprising:
a notification device; and
a processor configured to
set on a traveling road a notification location where the driver is to be notified of a control switching request for switching operation of the vehicle from automatic control to manual control, based on the shape of a width-varying zone where the width of the traveling road varies before a merging location, in a case where a merging location where the traveling road on which the vehicle is traveling within a traveling route toward a destination location of the vehicle merges with another road, and
notify the driver of the control switching request via the notification device when, based on determining that the vehicle has not entered the other road, at the notification location;
wherein the notification location is after a location where a scheduled traveling trajectory for a lane change was scheduled to occur.

2. The notification location setting device according to claim 1, wherein the processor is configured to set the notification location on the traveling road to be further away from the merging location with a smaller degree of decrease in the width of the width-varying zone toward the merging location.

3. The notification location setting device according to claim 2, wherein the processor is also configured to set an automatic control cancel location at which operation of the vehicle is forcibly changed from automatic control to manual control, based on the notification location.

4. The notification location setting device according to claim 1, wherein the processor is configured to determine a split location on the traveling road, where the width-varying zone is split at a predetermined ratio, and to set the notification location based on the split location.

5. The notification location setting device according to claim 4, wherein the processor is configured to set the split location in the traveling road so as to be further away from the merging location when a structure of at least a predetermined height is present alongside the width-varying zone, than when no structure of at least the predetermined height is present alongside the width-varying zone.

6. The notification location setting device according to claim 1, wherein the processor is also configured to detect the location where the width of the traveling road begins to vary before the merging location, as the start location of the width-varying zone, and detect the location on the traveling road that lines up with the intersection between an extension line which is the extension into the other road from the center line of the zone in which the width of the traveling road is varying before the merging location, and the center line of the other road, as the end location of the width-varying zone.

7. The notification location setting device according to claim 1, wherein the processor is also configured to detect the location where the width of the traveling road begins to vary before the merging location, as the start location of the width-varying zone, and detect the location where the zone in which the width of the traveling road is varying before the merging location has its width decreased to zero toward the traveling direction of the vehicle, as the end location of the width-varying zone.

8. The notification location setting device according to claim 1, wherein the processor being configured to notify the driver of the control switching request via the notification device is only based on determining that the vehicle has not entered the other road at the notification location.

9. The notification location setting device according to claim 1, wherein the processor being configured to set the notification location based on the shape of a width-varying zone includes being configured to set the notification location closer to a distal end of the width varying zone with respect to the vehicle when a degree in decrease of the width-varying zone is a first value than when the degree in decrease of the width-varying zone is a second value, the first value being more than the second value.

10. The processor-readable non-transitory storage medium according to claim 1, wherein the computer program causing the processor to set the notification location based on the shape of a width-varying zone includes causing the processor to set the notification location closer to a distal end of the width varying zone with respect to the vehicle when a degree in decrease of the width-varying zone is a first value than when the degree in decrease of the width-varying zone is a second value, the first value being more than the second value.

11. A processor-readable non-transitory storage medium that stores a computer program for notification location setting, and the computer program causes a processor to:
set on a traveling road a notification location where the driver is to be notified of a control switching request for switching operation of the vehicle from automatic control to manual control, based on the shape of a width-varying zone where the width of the traveling road varies before a merging location, in a case where a merging location where the traveling road on which the vehicle is traveling within a traveling route toward a destination location of the vehicle merges with another road; and notify the driver of the control switching request via a notification device when, based on determining that the vehicle has not entered the other road, at the notification location;

wherein the notification location is after a location where a scheduled traveling trajectory for a lane change was scheduled to occur.

12. The processor-readable non-transitory storage medium according to claim 8, wherein the computer program causing a processor to notify the driver of the control switching request via the notification device is only based on determining that the vehicle has not entered the other road at the notification location.

13. A notification location setting method wherein a notification location setting device executes to:

set on a traveling road a notification location where the driver is to be notified of a control switching request for switching operation of the vehicle from automatic control to manual control, based on the shape of a width-varying zone where the width of the traveling road varies before a merging location, in a case where a merging location where the traveling road on which the vehicle is traveling within a traveling route toward a destination location of the vehicle merges with another road; and notify the driver of the control switching request via a notification device when, based on determining that the vehicle has not entered the other road, at the notification location;

wherein the notification location is after a location where a scheduled traveling trajectory for a lane change was scheduled to occur.

14. The notification location setting method according to claim 13, wherein the notification location setting device executing to notify the driver of the control switching request via the notification device is only based on determining that the vehicle has not entered the other road at the notification location.

15. The notification location setting method according to claim 13, wherein the notification location setting device executing to set the notification location based on the shape of a width-varying zone includes executing to set the notification location closer to a distal end of the width varying zone with respect to the vehicle when a degree in decrease of the width-varying zone is a first value than when the degree in decrease of the width-varying zone is a second value, the first value being more than the second value.

* * * * *